United States Patent [19]

Ludwig

[11] 4,351,284
[45] Sep. 28, 1982

[54] INTERNAL COMBUSTION ENGINE WITH WATER HEATED INTAKE MANIFOLD

[75] Inventor: George C. Ludwig, Florence, S.C.

[73] Assignee: Tom McGuane Industries, Inc., Madison Heights, Mich.

[21] Appl. No.: 108,006

[22] Filed: Dec. 28, 1979

[51] Int. Cl.³ ............................................. F02M 31/00
[52] U.S. Cl. ..................................... 123/545; 123/552; 261/144
[58] Field of Search ............... 123/545, 546, 547, 552, 123/557; 261/145, 144

[56] References Cited

U.S. PATENT DOCUMENTS

| | | | |
|---|---|---|---|
| 1,243,647 | 10/1917 | Whittelsey | 123/552 |
| 1,300,600 | 4/1919 | Giesler | 123/552 |
| 1,318,068 | 10/1919 | Giesler | 123/552 |
| 2,054,997 | 9/1936 | Vang | 123/552 |
| 2,788,779 | 4/1957 | Mengelhamp | 123/552 |
| 2,949,103 | 8/1960 | Carlton | 123/547 |
| 3,918,421 | 11/1975 | Berry | 123/552 |
| 4,086,892 | 5/1978 | Marsee | 123/547 |

Primary Examiner—Ronald H. Lazarus
Attorney, Agent, or Firm—Barnes, Kisselle, Raisch & Choate

[57] ABSTRACT

A liquid cooled internal combustion engine including a water heated plenum associated with the intake manifold and a temperature controlled plenum valve in the water line extending to or from the plenum and operable to control the flow of water. The temperature controlled plenum valve comprises a plastic body including a base wall and a peripheral wall and a plastic cap including a base wall and a peripheral wall surrounding the peripheral wall of the plastic body. The peripheral wall of the base has a radially outwardly extending annular rib and the peripheral wall of the cap has a radially inwardly extending rib. The ribs are adapted to pass over one another to provide a snap fit during assembly. The base wall of the body has integral O-ring retainer for retaining an O-ring. A bi-metallic disc is positioned in the body within the confines of the peripheral wall of the body and normally engages said O-ring and is operable to engage the O-ring when the water temperature exceeds a predetermined amount.

3 Claims, 6 Drawing Figures

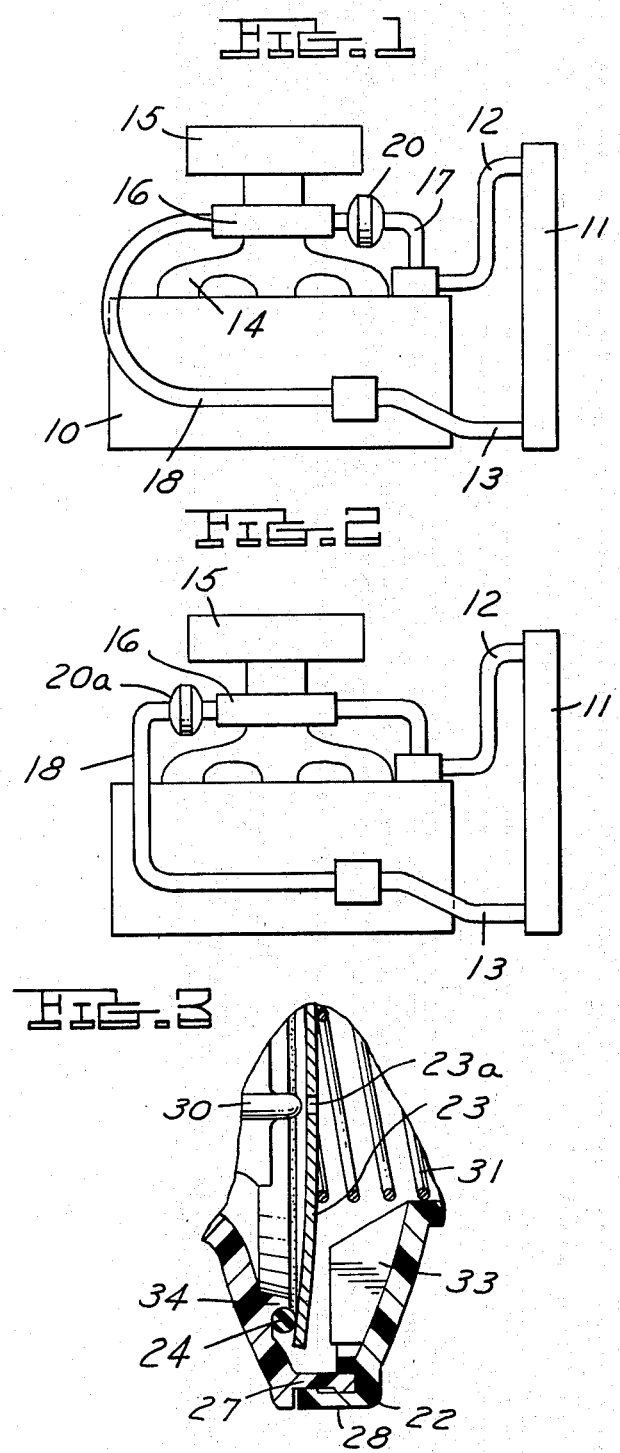

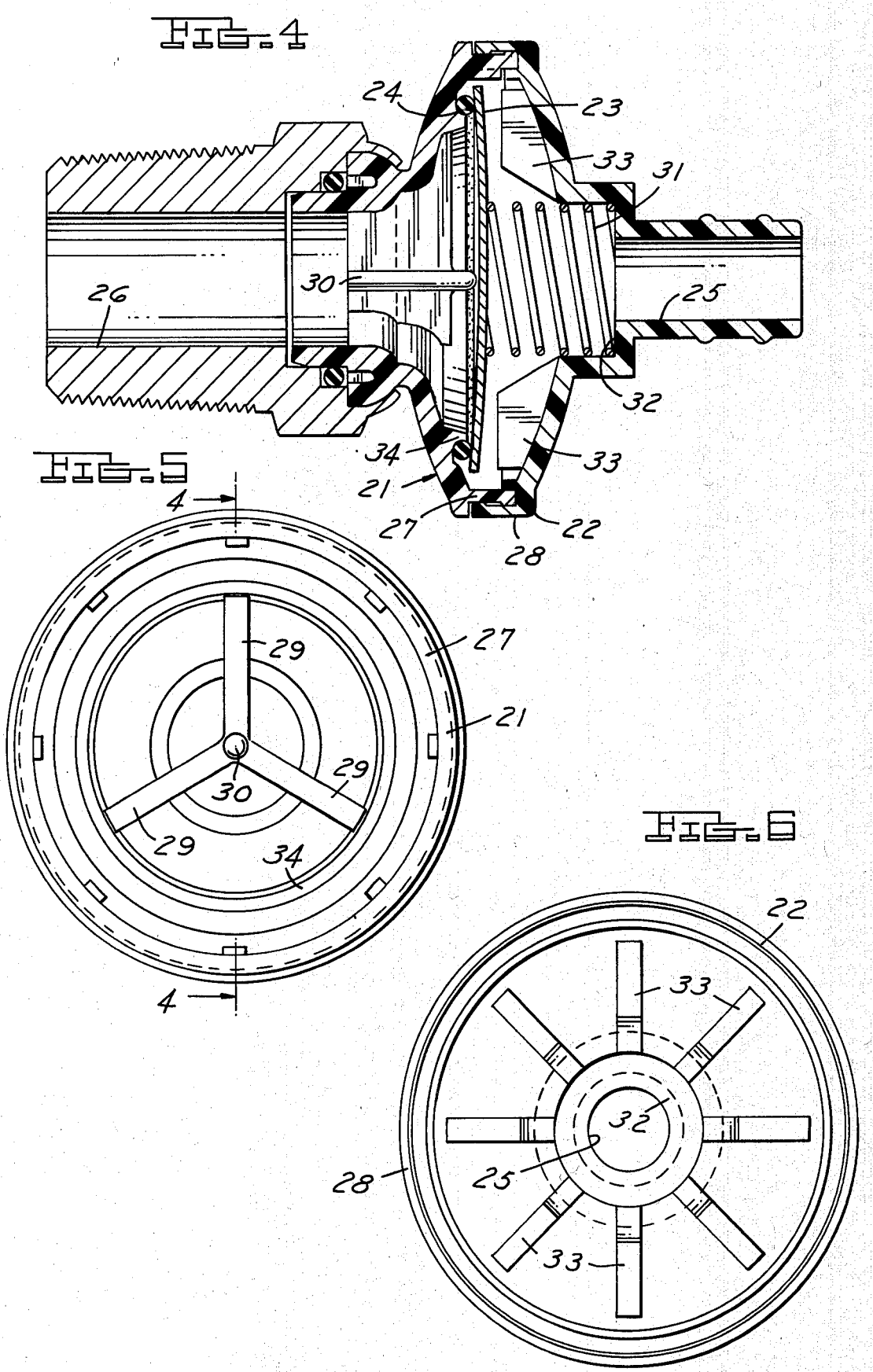

INTERNAL COMBUSTION ENGINE WITH WATER HEATED INTAKE MANIFOLD

This invention relates to internal combustion engines.

BACKGROUND AND SUMMARY OF THE INVENTION

In the control of internal combustion engines such as turbo-charged engines it has heretofore been suggested that a water heated plenum be associated with the intake manifold to facilitate warm up. It has also been suggested that the water heating be inhibited after warm up by providing a vacuum operated water valve controlled by a temperature switch.

The present invention is directed to an improved system which will function to inhibit the flow of heat to the intake manifold; which is relatively simple to manufacture; which can be preassembled for testing before placement in sealed condition; and which utilizes parts that can be manufactured at relatively low cost and be readily handled.

In accordance with the invention, a temperature controlled plenum valve is placed in the water line extending to or from the plenum associated with the intake manifold. The plenum valve comprises a plastic body including a base wall and a peripheral wall and a plastic cap including a base wall and a peripheral wall surrounding the peripheral wall of the plastic body. The peripheral wall of the base has a radially outwardly extending annular rib and the peripheral wall of the cap has a radially outwardly extending rib which are adapted to pass over one another to provide a snap fit during assembly. The base wall of said body having integral O-ring retainer for retaining an O-ring. A bi-metallic disc is positioned in the body within the confines of the peripheral wall of the body and normally engages the O-ring and is operable to engage the O-ring when the water temperature exceeds a predetermined amount.

DESCRIPTION OF THE DRAWINGS

FIG. 1 is a schematic diagram of the internal combustion engine system embodying the invention.

FIG. 2 is a schematic diagram of a modified internal combustion system embodying the invention.

FIG. 3 is a fragmentary sectional view of a temperature controlled plenum valve associated with the system shown in FIG. 2.

FIG. 4 is a part sectional view of a temperature controlled plenum valve embodying the invention.

FIG. 5 is a view taken axially of the cap of the temperature controlled plenum valve.

FIG. 6 is a view taken axially of the body of the temperature controlled plenum valve.

DESCRIPTION

FIG. 1 is a schematic view of an internal combustion engine embodying the invention comprising a water cooled engine 10, a radiator 11 connected to the engine by water lines 12, 13, a vacuum intake manifold 14 and a carburetor 15. A water heated plenum 16 is associated with the intake manifold 14 and is connected thereto by an outlet water line 17 from the engine and a return water line 18 to the engine.

In accordance with the invention, a temperature controlled plenum valve 20 is provided in the water outlet line 17.

Referring to FIG. 5, temperature controlled plenum valve 20 comprises a body 21 and a cap 22 that is snapped over a portion of the body 21 as presently described. The plenum valve 20 includes a bi-metallic disc 23 that normally is out of sealing engagement with an O-ring 24 so water can flow through passages 25, 26. Disc 23 functions toward the seal 24 when the water temperature rises above a predetermined value.

The body 21 and cap 22 are preferably made of plastic such as nylon which is reinforced with glass fibers. A preferred plastic is ZYTEL 103, a nylon made by E. I. duPont de Nemours and Company, having 33% glass fiber reinforcement.

The body 21 and cap 22 include peripheral walls 27, 28, respectively, which telescope within one another and are joined by fusion as described in connection with the fuel vent valve shown in U.S. Pat. No. 4,142,677.

Integral webs 29 in the body 21 extend radially and support an axial protrusion 30 which is engaged by the bi-metallic disc 23. A spring 31 is interposed between the disc 23 and a shoulder 32 in the cap 22.

The cap 22 further includes radially extending walls 33 that function as stop means for limiting the movement of the bi-metallic member 23 when the bi-metallic member 23 is out of engagement O-ring 24. An integral annular lip 34 on the inner surface of the base wall retains the O-ring 24 in position.

In operation, when the engine coolant is relatively cold, coolant flows freely through the plenum 16, providing the desired heat to the manifold. After warm up, where the temperature of the coolant reaches a predetermined value, for example 100° F., disc 23 moves against O-ring to stop the flow. As a result the peak engine horse power is not reduced as would occur when the coolant is permitted to flow through the plenum 16.

In the form of the invention shown in FIGS. 2 and 3, the temperature controlled plenum valve 20a is placed in the return water line 18. As shown in FIG. 3, the valve 20a is identical to the valve 20 shown in FIGS. 4–6 except that it includes an orifice 23 in the bi-metallic disc 23 which allows a metered flow past the disc 23. By this arrangement when the coolant reaches a predetermined temperature and the disc 23 closes against the seal 24, coolant will flow through the orifice 23a insuring that the disc 23 is at the temperature of plenum 16. When the plenum cools to a predetermined temperature, for example, 75° F., the disc 23 will momentarily open until the temperature reaches the higher predetermined valve. As a result, the valve will modulate keeping the temperature of the plenum between the two predetermined values.

I claim:

1. An internal combustion engine system comprising a liquid cooled internal combustion engine including a water heated plenum associated with the intake manifold thereof, an outlet water line and a return water line extending from said engine to said water cooled manifold, a temperature controlled normally open plenum valve in one of said lines, said valve comprising a body having an inlet and an outlet connected to its respective line, a bi-metallic disc in said body, a seal associated with said disc, said disc normally being out of engagement with said seal such that when the coolant is below a predetermined temperature, the coolant flows, and when the coolant reaches a predetermined value, the disc seals against said seal, said valve including an orifice permitting flow of coolant between opposite sides of said disc when said disc is in sealing engagement in said seal such that said disc will sense the temperature of coolant in said plenum and modulate between predetermined values.

2. The system set forth in claim 1 wherein said valve is in said outlet water line.

3. The system set forth in claim 1 wherein said valve is in said return water line.

* * * * *